United States Patent
Chapron et al.

(10) Patent No.: US 10,775,259 B2
(45) Date of Patent: Sep. 15, 2020

(54) SPRAY DEVICE AND LEAK DETECTION MODULE

(71) Applicant: PFEIFFER VACUUM, Annecy (FR)

(72) Inventors: Aurelie Chapron, Saint Felix (FR); Alain Devance, Saint Jorioz (FR); Mathieu Schreiner, Duingt (FR); Cyrille Nomine, Epagny (FR)

(73) Assignee: PFEIFFER VACUUM, Annecy (FR)

( * ) Notice: Subject to any disclaimer, the term of this patent is extended or adjusted under 35 U.S.C. 154(b) by 281 days.

(21) Appl. No.: 16/071,217

(22) PCT Filed: Jan. 13, 2017

(86) PCT No.: PCT/EP2017/050722
§ 371 (c)(1),
(2) Date: Jul. 19, 2018

(87) PCT Pub. No.: WO2017/125327
PCT Pub. Date: Jul. 27, 2017

(65) Prior Publication Data
US 2020/0009591 A1    Jan. 9, 2020

(30) Foreign Application Priority Data
Jan. 21, 2016 (FR) ..................... 16 50476

(51) Int. Cl.
*G01M 3/20* (2006.01)
*B05B 9/01* (2006.01)
*B05B 12/00* (2018.01)

(52) U.S. Cl.
CPC .............. *G01M 3/205* (2013.01); *B05B 9/01* (2013.01); *B05B 12/008* (2013.01); *G01M 3/202* (2013.01)

(58) Field of Classification Search
CPC ......... B05B 1/005; B05B 9/01; B05B 12/008; B05B 12/002; B05B 12/081; G01M 3/20–229
See application file for complete search history.

(56) References Cited

U.S. PATENT DOCUMENTS 3,070,992 A * 1/1963 Nemeth ................ G01M 3/205
                                                                 73/40.7
5,168,747 A * 12/1992 Weaver ................ G01M 3/202
                                                                 73/40.7
(Continued)

FOREIGN PATENT DOCUMENTS

| CN | 201731980 U | 2/2011 |
| DE | 10 2007 035 932 A1 | 2/2009 |
| JP | 2008-101957 A | 5/2008 |

OTHER PUBLICATIONS

International Search Report dated Apr. 10, 2017 in PCT/EP2017/050722 filed Jan. 13, 2017.
(Continued)

*Primary Examiner* — Nathaniel J Kolb
(74) *Attorney, Agent, or Firm* — Oblon, McClelland, Maier & Neustadt, L.L.P.

(57) ABSTRACT

A spray device for detecting leaks is provided, including: a duct including an inlet configured to be connected to a tracer gas source, and an outlet; a valve interposed between the inlet and the outlet; a casing receiving the duct and the valve; at least one probe arranged in the duct, the at least one probe being configured to measure a parameter revealing a presence of the tracer gas in the duct; and at least one information device borne by the casing, configured to provide information on the presence of tracer gas in the duct in relation to a measurement performed by the at least one probe.

12 Claims, 2 Drawing Sheets

(56) References Cited

U.S. PATENT DOCUMENTS

Figure 3:
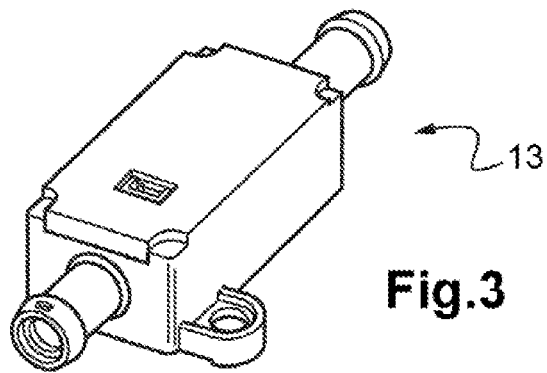

| | | | | |
|---|---|---|---|---|
| 5,184,369 | A * | 2/1993 | McElroy | B60S 3/002 |
| | | | | 15/316.1 |
| 7,017,838 | B2 * | 3/2006 | Schmon | B05B 12/008 |
| | | | | 239/290 |
| 2003/0189105 | A1 * | 10/2003 | Schmon | B05B 12/008 |
| | | | | 239/291 |
| 2007/0000310 | A1 | 1/2007 | Yamartino et al. | |
| 2007/0240493 | A1 * | 10/2007 | Conlan | G01M 3/205 |
| | | | | 73/40.7 |
| 2010/0253376 | A1 * | 10/2010 | Grosse Bley | G01M 3/205 |
| | | | | 324/754.01 |
| 2014/0076985 | A1 * | 3/2014 | Pettersson | B05B 7/0846 |
| | | | | 239/11 |
| 2016/0055733 | A1 * | 2/2016 | Zhang | G01S 19/01 |
| | | | | 340/8.1 |
| 2019/0303629 | A1 * | 10/2019 | Hoffa | G05B 19/182 |

OTHER PUBLICATIONS

Combined Chinese Office Action and Search Report dated Nov. 25, 2019 in corresponding Chinese Patent Application No. 201780007251.4 (with English Translation and English Translation of Category of Cited Documents) citing documents therein, 12 pages.

* cited by examiner

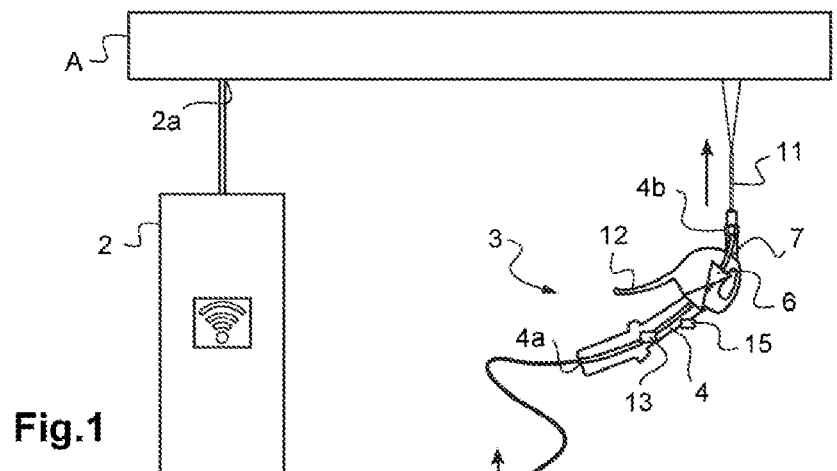
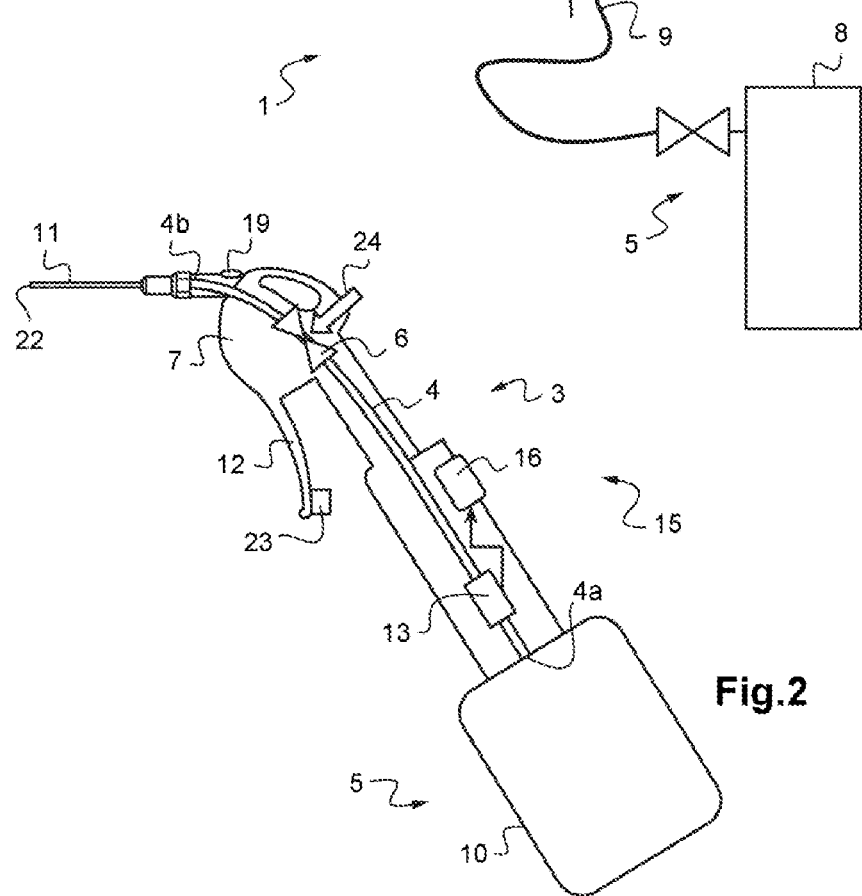

SPRAY DEVICE AND LEAK DETECTION MODULE

The present invention relates to a spray device for detecting leaks and to a leak detection module comprising the spray device.

One known method for checking the seal-tightness of an object consists in performing a so-called tracer gas "spray" test. This method involves the detection of the passage of the tracer gas, generally helium, through any leaks of the object to be tested.

In spray mode, the tracer gas is sprayed onto the object to be tested with a spray gun, the internal volume of the object being linked to a leak detector. The search for leaks is performed by moving the end of the spray gun around the object, in particular in zones likely to exhibit seal-tightness weaknesses, such as around seals.

To ensure that helium, odorless and colorless, is indeed sprayed by the spray gun, one technique consists in bringing the end of the spray gun close to the mouth. The user feels a slight pressure on his or her lips if tracer gas is present.

Another means consists in dipping the end of the spray gun into a container of water. The user can thus check for the presence of the tracer gas by observing whether bubbles form in the liquid.

Another method that can be employed consists in listening for whether a flow rate of tracer gas is indeed escaping from the spray gun.

These methods do however remain imprecise because they are linked to the perception which can be made thereof by the user.

Moreover, the user may risk fowling or clogging the orifice of the spray gun by dipping the spray gun into the liquid.

Furthermore, not inconsiderable concentrations of tracer gas can thus be released around the object to be tested, in particular when the user forces the flow rate of tracer gas either to listen for the tracer gas jet, or to view the bubbles, or to feel the pressure of the tracer gas on his or her lips. These quantities of gas released increase the background noise, which can be detrimental to the quality of the inspection.

Another drawback is that these methods do not guarantee that helium is still projected afterwards, during the search. In effect, after the check at the start of the test, the operator may believe that he or she is indeed spraying the object to be tested with helium whereas nothing more is escaping from the spray gun. He or she may thus risk missing one or more leaks.

One of the aims of the present invention is therefore to propose a spray device for detecting leaks and a spray module which at least partly resolve the abovementioned drawbacks.

To this end, the subject of the invention is a spray device for detecting leaks, comprising:
  a duct comprising:
    an inlet configured to be connected to a tracer gas source, and
    an outlet,
  a valve interposed between the inlet and the outlet,
  a casing receiving the duct and the valve,
  characterized in that the spray device comprises:
    at least one probe arranged in the duct, the probe being configured to measure a parameter revealing the presence of the tracer gas in the duct, and
    at least one information device borne by the casing, configured to give information on the presence of tracer gas in the duct in relation to the measurement performed by the probe.

The user can thus simply, reliably, rapidly and cleanly make sure that tracer gas is indeed blown by the spray device. Furthermore, a measurement can be performed regularly or continually to avoid having the spray device no longer spray tracer gas during the search for leaks.

According to one or more features of the spray device, taken alone or in combination,
  the probe is arranged downstream of the valve in the direction of circulation of the gases, the probe comprising a flow rate sensor,
  the probe is arranged upstream of the valve in the direction of circulation of the gases, the probe comprising a flow rate sensor or a pressure sensor,
  the spray device comprises a comparator device linked to the probe and to the information device, the comparator device being configured to compare the measurement of the probe with at least one minimum threshold for indicating the presence or the absence of tracer gas in the duct based on the result of the comparison,
  the information device is configured to emit a signal representative of the measurement of the probe,
  the spray device comprises:
    a passive sensor configured to detect the actuation of the valve, and
    a trigger configured to actuate the valve, the trigger bearing the passive sensor,
  the spray device comprises an end-fitting arranged at the outlet of the duct and a proximity sensor arranged at one end of the end-fitting,
  the information device comprises at least one light-emitting diode and/or a screen and/or a loudspeaker and/or a vibratory actuator,
  the spray device comprises a flow rate adjustment device arranged in the duct for adjusting the flow rate of tracer gas downstream of the valve,
  the spray device comprises a control unit configured to communicate with a leak detector by wireless communication,
  the control unit is configured to indicate information on the flow of tracer gas measured by the leak detector by means of the information device,
  the spray device comprises a battery accommodated in the casing to power the probe and the information device,
  the probe is a microsystem of MEMS type.

One subject of the invention is a spray device for detecting leaks, comprising:
  a duct comprising:
    an inlet configured to be connected to a tracer gas source, and
    an outlet,
  a valve interposed between the inlet and the outlet,
  a casing receiving the duct and the valve,
  characterized in that the spray device comprises:
    at least one probe arranged in the duct, the probe being configured to measure a parameter revealing the presence of the tracer gas in the duct, and
    at least one information device borne by the casing, configured to give information on the presence of tracer gas in the duct in relation to the measurement performed by the probe,
    a passive sensor configured to detect the actuation of the valve, and a trigger configured to actuate the valve, the trigger bearing the passive sensor.

Another subject of the invention is a spray device for detecting leaks, comprising:
 a duct comprising:
  an inlet configured to be connected to a tracer gas source, and
  an outlet,
 a valve interposed between the inlet and the outlet,
 a casing receiving the duct and the valve,
 characterized in that the spray device comprises:
  at least one probe arranged in the duct, the probe being configured to measure a parameter revealing the presence of the tracer gas in the duct, and
  at least one information device borne by the casing, configured to give information on the presence of tracer gas in the duct in relation to the measurement performed by the probe,
  an end-fitting arranged at the outlet of the duct and a proximity sensor arranged at one end of the end-fitting.

Another subject of the invention is a spray device for detecting leaks, comprising:
 a duct comprising:
  an inlet configured to be connected to a tracer gas source, and
  an outlet,
 a valve interposed between the inlet and the outlet,
 a casing receiving the duct and the valve,
 characterized in that the spray device comprises:
  at least one probe arranged in the duct, the probe being configured to measure a parameter revealing the presence of the tracer gas in the duct, and
  at least one information device borne by the casing, configured to give information on the presence of tracer gas in the duct in relation to the measurement performed by the probe,
  a control unit configured to communicate with a leak detector by wireless communication.

Also the subject of the invention is a leak detection module for testing the seal-tightness of an object to be tested by spraying tracer gas, characterized in that it comprises a spray device as described previously and a tracer gas source comprising a tracer gas cartridge that can be connected to the inlet of the duct of the spray device.

Figure 4:
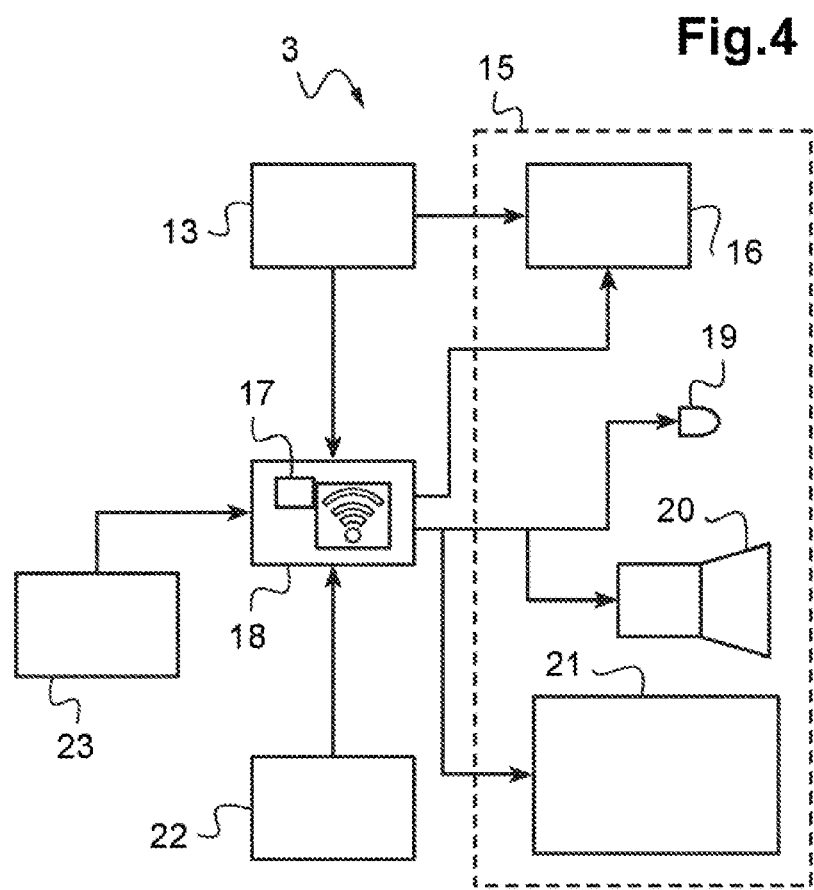

Other features and advantages of the invention will emerge from the following description, given by way of example, in an unlimiting manner, with respect to the attached drawings in which:

FIG. 1 shows a schematic view of an exemplary leak detection module for testing the seal-tightness of an object to be tested in spray mode, FIG. 2 shows a schematic view of another exemplary leak detection module, FIG. 3 shows an exemplary probe, and FIG. 4 shows a schematic view of elements of the spray device of a leak detection module.

In these figures, the elements that are identical bear the same reference numbers. The following embodiments are examples. Although the description refers to one or more embodiments, that does not necessarily mean that each reference relates to the same embodiment, or that the features apply only to a single embodiment. Simple features of different embodiments can also be combined or interchanged to provide other embodiments.

Hereinafter in the description, the terms "upstream" and "downstream" will be used with reference to the direction of flow of the gases from the tracer gas source 5 to the end of the end-fitting 11.

FIG. 1 shows a leak detection module 1 for testing the seal-tightness of an object to be tested A in spray mode. The object to be tested A is connected to a leak detector and possibly to an auxiliary pumping device (not represented).

The leak detection module 1 comprises a spray device 3 comprising a duct 4, a valve 6 interposed between an inlet 4a and an outlet 4b of the duct 4, the spray device 3 also comprising a portable casing 7 receiving in particular the duct 4 and the valve 6.

The inlet 4a of the duct 4 is connected to a tracer gas source 5, such as a tracer gas cylinder 8, via a flexible line 9 (FIG. 1), or such as a tracer gas cartridge 10 (FIG. 2), possibly rechargeable, and connected to the inlet 4a of the duct 4, for example via a quick-release coupling.

Helium or hydrogen is generally used as tracer gas because these gases pass through the small leaks more easily than other gases, because of the small size of their molecule and their fast displacement speed.

The outlet 4b of the duct 4 is connected to a removable end-fitting 11 making it possible to blow a jet of tracer gas. The end-fitting 11 comprises, for example, a long and thin metal pipe to facilitate access to search zones of small dimensions.

The valve 6 can be actuated by a trigger 12 of the spray device 3, the casing 7 for example taking the form of a pistol. The trigger 12 can be manipulated by the user such that its actuation opens the valve 6 to allow the spraying of a tracer gas jet at the end of the end-fitting 11.

The possible presence of the tracer gas is sought by moving the end-fitting 11 around the object to be tested A to spray it with tracer gas. The inlet 2a of the leak detector 2 samples a portion of the gases contained in the object to be tested A. A portion of the gases thus sampled, possibly containing the tracer gas revealing a leak, is then analyzed by a gas analyzer of the detector 2 such as a mass spectrometer, which supplies a tracer gas flow measurement signal. The location of the leak detector 2 where the measurement is performed and the position of the spray device 3 can be relatively far apart from one another.

As can be seen better in FIG. 2, the spray device 3 also comprises at least one probe 13 arranged in the duct 4 and at least one information device 15 borne by the casing 7. The probe 13 is configured to measure a parameter revealing the presence of the tracer gas, such as the pressure or the flow rate. The information device 15 is configured to give information on the presence of the tracer gas in the duct 4 in relation to the measurement performed by the probe 13.

The user can thus simply, reliably, rapidly and cleanly make sure that tracer gas is indeed blown by the spray device 3. Furthermore, a measurement can be performed regularly or continually to avoid having the spray device 3 no longer spray tracer gas during the search for leaks.

The probe 13 comprises, for example, a pressure sensor such as a differential pressure sensor. The differential pressure sensor comprises a first inlet configured to measure the pressure in the duct 4 and a second inlet configured to measure the external (atmospheric) pressure. If the pressure difference between the first and the second inlet is above a minimum threshold, then the flow of tracer gas is sufficient to conclude that tracer gas is present in the duct 4.

The probe 13 can comprise a flow rate sensor, for example based on the principle of differential temperature measurement, the temperature being taken at two points spaced apart from one another along the duct 4.

The probe 13 can be arranged downstream of the valve 6 in the direction of circulation of the gases, the probe 13 then being a flow rate sensor.

The probe 13 can be arranged upstream of the valve 6 in the direction of circulation of the gases, the probe 13 being a flow rate sensor or a pressure sensor.

The probe 13 is for example a microsystem of MEMS (micro-electromechanical system) type (FIG. 3), that is to say comprising at least one structure having micrometric dimensions; the function of the probe 13 being partly ensured by the form of this structure. The miniaturization of the electronic components (less than 10 mm long for example for a market-standard probe) allows for the integration of the probe 13 in the casing 7 of the portable spray device 3. The electrical consumption of the MEMSs is low and therefore compatible with the use of a battery accommodated in the casing 7.

The information device 15 can emit a signal representative of the measurement of the probe 13. The information device 15 comprises, for example, a screen 16, such as a digital screen or a liquid crystal display (LCD) linked to the probe 13 to directly display the pressure or flow rate values measured by the probe 13 (FIG. 4). The user is thus accurately informed of the quantity of tracer gas circulating in the duct 4.

It is also possible to provide for the spray device 3 to include a comparator device 17 linked to the probe 13 and to the information device 15. The comparator device 17 is configured to compare the measurement of the probe 13 with at least one minimum threshold to indicate the presence or the absence of tracer gas in the duct 4 based on the result of the comparison.

The comparator device 17 can also be configured to compare the measurement of the probe 13 with at least one maximum threshold to indicate when the duct 4 exhibits excessive tracer gas flow or pressure.

The comparator device 17 comprises, for example, an electronic circuit comprising a comparator.

According to another example, the comparator device 17 is produced by a control unit 18 of the spray device 3, such as a microcontroller, programmed to compare the measurement of the probe 13 with at least one minimum threshold to indicate the presence or the absence of tracer gas in the duct 4 based on the result of the comparison.

The control unit 18 can comprise a wireless communication module of WIFI, Bluetooth or similar type, for communicating with the leak detector 2 by wireless communication. The wireless communication module and the battery needed to power the various electrical or electronic components, in particular to power the probe 13 and the information device 15, are accommodated in the casing 7.

The control unit 18 can then receive a signal of measurement of the tracer gas flow in the object to be tested A and/or information on the status of the leak detector 2 and indicate such information to the user by means of the information device 15. The information on the status of the detector 2, namely whether the leak detector 2 is currently performing a measurement, for example allows the user, not being able to directly view the leak detector 2, to check that it is indeed in the process of carrying out a measurement to conclude on the absence of leaks in the presence of a low or nil measurement signal.

The advantage of being able to refer the information from the leak detector 2 to the spray device 3, and therefore to the user manipulating it, is that that allows the user to know the flow of tracer gas measured in the object to be tested A at the point where he or she sprays the object to be tested A with tracer gas.

The control unit 18 can also be configured to drive the launching of a measurement of the flow of tracer gas and/or the cancellation of the background noise of the leak detector 2. The cancellation of the background noise makes it possible to assign a nil value to a tracer gas flow measurement. By subtracting the background noise from the tracer gas flow value measured, the measurement sensitivity is increased. That makes it possible to more easily detect the presence of a leak when the level of the background noise is high without waiting for a drop in the level of tracer gas and without ventilating the atmosphere.

The information device 15 can be visual, audible or tactile. The visual information device 15 is for example arranged on the back of the casing 7 so as to be visible to the user when the latter actuates the trigger 12.

The information device 15 comprises, for example, at least one light-emitting diode 19 (LED) and a power cell for the LED 19, such as a flat lithium cell. Several monochrome LEDs or one multicolor LED can be arranged.

The control unit 18 can be configured to apply a color code making it possible to inform the user as to the level of the tracer gas flow. For example, the LED is lit in red (continuous or blinking) when the flow or the pressure is low or nil and lit in green when the flow or the pressure is at a correct level. It is also possible to have an LED blink for example when the pressure or the flow rate is above the maximum threshold.

The information device 15 comprises, for example, a loudspeaker 20. The control unit 18 can be configured to apply a sound code to inform the user of the level of the tracer gas flow. The sound code can comprise a first sound pattern indicating that the flow or the pressure is low or nil, a second sound pattern when the flow or the pressure is at a correct level and a third sound pattern when the pressure or the flow rate is above the maximum threshold. The loudspeaker 20 borne by the casing 7 can also be used by the control unit 18 if necessary, to indicate the level of leaks measured by the leak detector 2.

The information device 15 can comprise at least one vibratory actuator 21. The control unit 18 can be configured to apply a vibratory code informing the user of the level of tracer gas flow in the duct 4 with different vibratory patterns. The vibratory actuator 21 borne by the casing 7 can also be used by the control unit 18 if necessary, to indicate the level of leaks measured by the leak detector 2.

The spray device 3 can also comprise a proximity sensor 22, such as a capacitive sensor, arranged at the end of the end-fitting 11. In the case of a communication between the spray device 3 and the leak detector 2, the proximity sensor 22 is configured to supply an output signal to the control unit 18. It is then possible to correlate the proximity of the end-fitting 11 with the object to be tested A, with the measurement of the flow of tracer gas in the object to be tested A. That makes it possible to simplify and validate the detection and the location of a leak in the object to be tested A. Also, the proximity sensor 22 can allow the control unit 18 to confirm that a predefined number of positions on the object to be tested A have indeed been tested, which can be useful for a quality inspection, in particular for tests performed in production.

The spray device 3 can also comprise a passive sensor 23 borne by the trigger 12. The passive sensor 23, such as a resistive or capacitive sensor, is configured to detect an actuation of the trigger 12 by the user and to supply an output signal to the control unit 18. The output signal can make it possible to trigger a measurement of the flow of tracer gas in the object to be tested A by the leak detector 2 when the control unit 18 has detected that the user has pressed on the trigger 12.

The spray device 3 can also comprise a flow rate adjustment device 24 arranged in the duct 4, to modify the gas flow rate downstream of the valve 6. The flow rate adjustment device 24 can comprise an additional valve that is adjustable, for example manually, arranged downstream of the valve 6. Alternatively, the valve 6 allowing the closure and the opening of the duct 4 can be configured to allow the user to adjust the flow rate in the duct 4. The flow rate of tracer gas can thus be limited to a low level based on the indications given by the information device 15, which makes it possible to limit the tracer gas background noise.

The invention claimed is:
1. A spray device for detecting leaks, comprising:
a duct comprising:
an inlet configured to be connected to a tracer gas source, and
an outlet;
a valve interposed between the inlet and the outlet;
a casing receiving the duct and the valve;
at least one probe arranged in the duct, the at least one probe being configured to measure a parameter revealing a presence of the tracer gas in the duct;
at least one information device borne by the casing, configured to provide information on the presence of tracer gas in the duct in relation to a measurement performed by the at least one probe; and
a control unit configured to communicate with a leak detector by wireless communication, wherein the control unit is further configured to indicate information on a flow of tracer gas measured by the leak detector by means of the information device.

2. The spray device according to claim 1, wherein the at least one probe is arranged downstream of the valve in a direction of circulation of the gases, the at least one probe comprising a flow rate sensor.

3. The spray device according to claim 1, wherein the at least one probe is arranged upstream of the valve in a direction of circulation of the gases, the at least one probe comprising a flow rate sensor or a pressure sensor.

4. The spray device according to claim 1, further comprising a comparator device linked to the at least one probe and to the information device, the comparator device being configured to compare the measurement performed by the at least one probe with at least one minimum threshold indicating the presence or absence of the tracer gas in the duct based on a result of the comparison.

5. The spray device according to claim 1, wherein the at least one information device is further configured to emit a signal representative of the measurement performed by the at least one probe.

6. The spray device according to claim 1, further comprising:
a passive sensor configured to detect actuation of the valve; and
a trigger configured to actuate the valve, the trigger bearing the passive sensor.

7. The spray device according to claim 1, further comprising an end fitting arranged at the outlet of the duct and a proximity sensor arranged at one end of the end-fitting.

8. The spray device according to claim 1, wherein the at least one information device comprises at least one light emitting diode or a screen or a loudspeaker or a vibratory actuator.

9. The spray device according to claim 1, further comprising a flow rate adjustment device arranged in the duct for adjusting a flow rate of tracer gas downstream of the valve.

10. The spray device according to claim 1, further comprising a battery accommodated in the casing to power the at least one probe and the at least one information device.

11. The spray device according to claim 1, wherein the at least one probe is a microsystem of a microelectromechanical system (MEMS) type.

12. A leak detection module for testing a seal tightness of an object to be tested by spraying tracer gas, the leak detection module comprising:
a spray device according to claim 1; and
a tracer gas source comprising a tracer gas cartridge configured to be connected to the inlet of the duct of the spray device.

* * * * *